United States Patent

[11] 3,611,097

| [72] | Inventor | John A. Joslyn |
| | | Dalton, Mass. |
| [21] | Appl. No. | 8,927 |
| [22] | Filed | Feb. 5, 1970 |
| [45] | Patented | Oct. 5, 1971 |
| [73] | Assignee | General Electric Company |

[54] DIGITAL CONTROL SYSTEM FOR AC TO DC POWER CONVERSION APPARATUS
12 Claims, 5 Drawing Figs.

[52] U.S. Cl. .................................................. 318/318,
318/329, 318/341, 321/5, 323/24
[51] Int. Cl. ..................................................... H02p 5/16,
H02m 7/52
[50] Field of Search .......................................... 318/314,
318, 630, 329, 341, 195; 321/16, 52, 5; 323/22 SC,
24, 25; 235/177, 168; 340/146.2; 307/222, 223,
252.70

[56] References Cited
UNITED STATES PATENTS

| 2,537,427 | 1/1951 | Seid et al. | 318/630 |
| 3,176,208 | 3/1965 | Gifft | 318/318 X |
| 3,249,838 | 5/1966 | Mierendork | 318/257 |
| 3,196,262 | 7/1965 | Thompson | 340/146.2 X |
| 3,431,479 | 3/1969 | Joslyn | 318/257 |
| 3,491,283 | 1/1970 | Johnston | 323/24 X |

*Primary Examiner*—Oris L. Rader
*Assistant Examiner*—Robert J. Hickey
*Attorneys*—James C. Davis, Jr., Edward W. Goebel, Jr., Frank L. Neuhauser, Oscar B. Waddell and Joseph B. Forman ABSTRACT: A digital control system for controlling the conversion of electric power from AC power to DC power for delivery to a load. A digital command signal is compared with a digital feedback signal indicative of motor speed so as to generate a digital error signal. A phase detection circuit examines the three phases of the AC source so as to synchronously load the digital error signal into the digital firing circuit associated with each phase at the appropriate time. The digital firing circuits include a plurality of reversible counters which count up during one portion of an excitation cycle and count down for another portion of an excitation cycle. When counting up, if a reversible counter reaches a preset number, a firing pulse is generated for a positively poled SCR. On the other hand, if the reversible counter is counting down, when the counter reaches a preset number, a firing pulse is generated for a negatively poled SCR.

3,611,097

DIGITAL CONTROL SYSTEM FOR AC TO DC POWER CONVERSION APPARATUS

BACKGROUND OF THE INVENTION

The present invention relates to a digital power amplifier for controlling the flow of power from an AC source to a load. More specifically, the present invention relates to a primarily digital control system for controlling the conduction of controllable rectifiers placed between an AC source and a load.

One of the best known systems having the capability of supplying varying amounts of electrical power comprises controllable rectifiers placed between a single or multiphase AC source and the system load. Such controllable rectifiers may comprise, for example, thyratrons or silicon-controlled rectifiers (SCR's). The amount of power transferred to the system load is controlled by varying the duration of conduction of the controllable rectifiers. The duration of conduction of the controllable rectifiers is a function of the point during the AC waveform at which it is initiated into conduction. This point is referred to as the firing angle.

Control of the firing angle of controllable rectifiers is carried out by circuitry referred to generally as firing circuits. Such firing circuits act in response to an input signal, indicative of desired power, to generate a firing pulse at the appropriate firing angle. Generally speaking, the firing angle is directly proportional to the input signal.

Firing circuits heretofore have generally been of the analog type, operating in response to an input signal whose magnitude indicates the desired firing angle. Such analog firing circuits have been consistent with prior art systems which have been primarily analog in operation.

With the advent of digital circuitry, it is becoming desirable to utilize digital techniques and digital circuitry in such control systems. This is particularly true where the system requires accuracy, reliability, or drift-free operation which are achievable only with digital circuitry. Hence, it is becoming fairly common to replace elements of an analog system with functionally equivalent digital circuitry.

In systems which utilize controllable rectifiers to control the flow of power from an AC source to a load, digital circuitry has often been used to generate the system command signals and to perform the necessary arithmetic operations to derive the input signal for controlling the conduction of the controllable rectifiers. This signal is then in digital form and it has been necessary to convert it to an analog voltage for use with conventional analog firing circuits. This practice has, however, resulted in some inherent sacrifice of the reliability which is otherwise available in an all digital control system.

SUMMARY OF THE INVENTION

It is an object of the present invention to provide an all digital control system for controlling the flow of power from an AC source to a load.

It is further object of the present invention to provide an all-digital control system for controlling the conduction of controllable rectifiers.

It is a still further object of the present invention to provide a digital firing circuit for controllable rectifiers.

Briefly stated, the present invention operates to generate a digital error signal which is used to directly control the conduction of controllable rectifiers without first converting this signal to an analog voltage. Phase detection means cause the digital error signal to be loaded into a digital error counter at the earliest point in an input wave at which controllable rectifiers can be fired. When the contents of said digital error counter reaches a predetermined value, one of the controllable rectifiers is fired.

DESCRIPTION OF THE DRAWINGS

While the specification concludes with claims particularly pointing out and distinctly claiming the subject matter which is regarded as the invention, an illustration of a particular embodiment can be seen by referring to the specification in connection with the accompanying drawings in which:

Component identification numbers are associated with the same component in whatever figures they appear.

DESCRIPTION OF THE PREFERRED EMBODIMENTs

Figure 1:
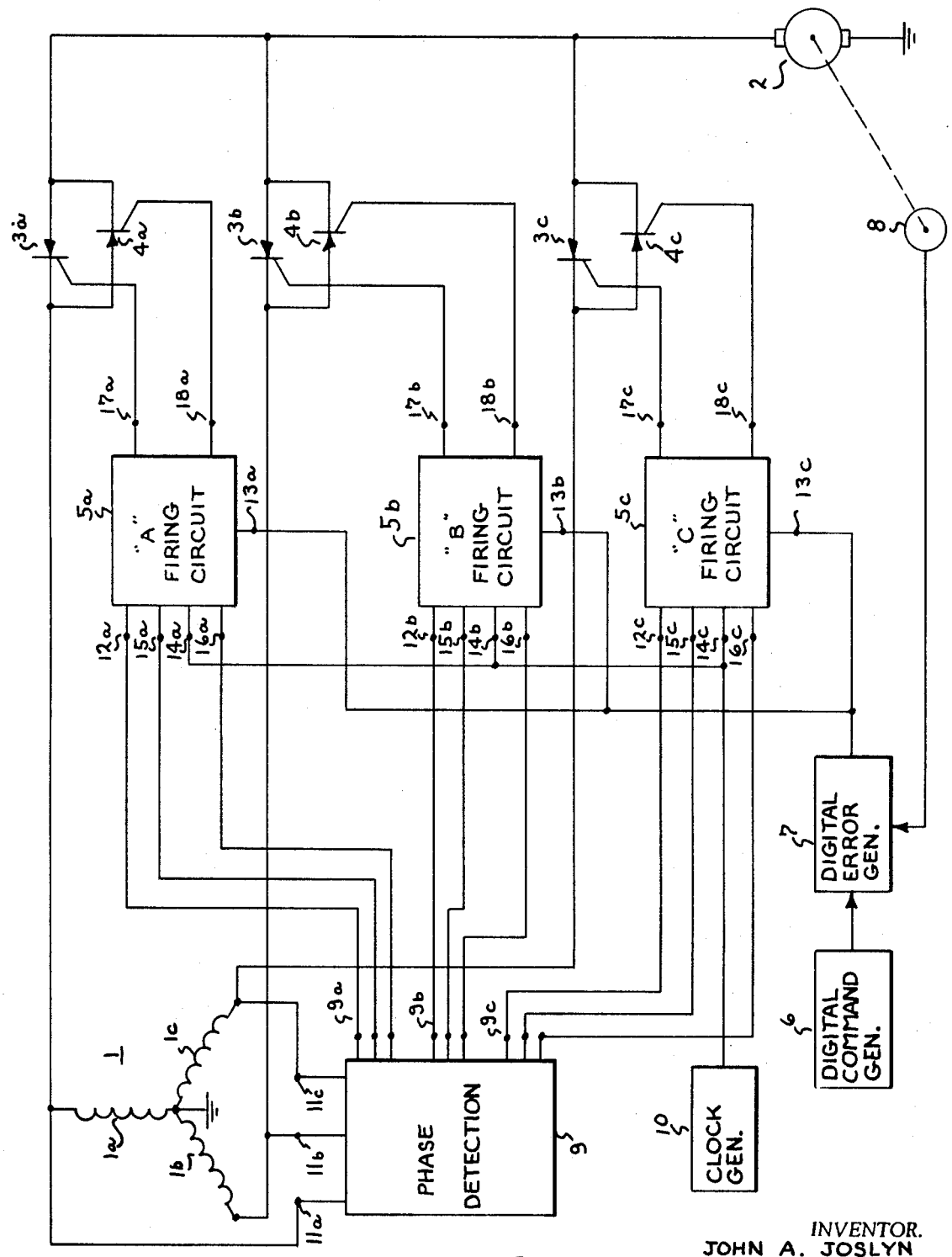
FIG. 1 is a block diagram of a system which is a preferred embodiment of the invention.

Turning now to FIG. 1 there is shown a block diagram of a control system embodying the present invention. Power is transferred from an AC source such as the three-phase transformer indicated generally at 1 to a load such as the DC motor 2 by way of a plurality of sets of oppositely poled controllable rectifiers such as the SCR's 3a, 3b, 3c, 4a, 4b, 4c. The SCR's are initiated into conduction by firing circuits such as 5a, 5b, and 5c which act to generate a firing pulse for the appropriate SCR at the desired time during the AC waveform. The system of FIG. 1 is a digital control system and operates in response to a command signal in digital form as generated by a digital command generator 6. The precise form of the digital command signal is not important for the purposes of the present invention. It may comprise, for example, a pulse train whose frequency is indicative of the desired motor speed or, alternatively, a digital number whose magnitude is indicative of the desired speed. In addition, the particular form of the digital command generator 6 is not important for the purposes of the present invention but may comprise, for example, a pulse rate multiplier or other variable frequency generator in the case where the output is a variable frequency pulse train. Similarly, if the output is a digital number, any of several well-known methods of generating a multibit digital code would suffice for the digital command generator 6.

The output of the digital command generator 6 is a first input to a digital error generator 7. The other input to the digital error generator 7 comes from a feedback device 8 which is connected to and driven by the motor 2. The feedback device 8 may comprise, for example, a simple pulse generator whose output frequency is proportional to the speed of the motor being controlled. The purpose of the digital error generator 7 is to compare the digital command from the digital command generator 6 with the output of the feedback device 8 and generate an error signal for controlling the conduction of the controllable rectifiers interposed between the AC source 1 and the motor 2. For the purposes of the present invention, the digital error generator is shown as having one output signal which is referred to in this specification as an error signal and which is preferably taken from a digital counter or register in error generator 7.

The firing circuits 5a, 5b, and 5c are digital in form and are adapted to accept the output of the digital error generator and generate a firing pulse for the appropriate SCR in response to the magnitude and polarity of the digital error. Hence, it is necessary to load the contents of the digital error generator 7 into the appropriate firing circuits 5a, 5b, and 5c at the proper time. The timing for loading the digital error into the firing circuits is controlled by means of a phase detection circuit 9 which is connected at its inputs to the three phases of the AC power source 1. As will be pointed out in detail hereinafter, the system will provide for the conduction of the SCR's connected to a particular phase of the AC source during particular times. The control of this timing is accomplished by the phase detection circuit 9 which generates output signals on its outputs 9a, 9b and 9c to initiate the loading of the digital error signal from the digital error generator 7 into the appropriate firing circuits. The phase detection circuit 9 also supplies signals to input terminals 15a, 15b, 15c, and to input terminals 16a, 16b, and 16c of the firing circuits 5a, 5b, and 5c to determine whether the negative polarity controllable rectifiers 3a, 3b, and 3c, or the positive polarity controllable rectifiers 4a, 4b, and 4c, respectively, are fired by the firing circuits. It is often desirable to include a lockout circuit between the armature circuit of the motor 2 and the firing circuits 5a, 5b, and 5c. The lockout circuit can be connected across a resistor or in some other manner connected so as to sense the direction of current flow through the motor 2. This lockout circuit then prevents controllable rectifiers which supply current in one direction from being fired while the current is flowing through the armature in the opposite direction. Broadly stated, the purposes of the phase detection circuit 9 are: to sense the earliest point during each half cycle of the AC input at which a firing pulse can be generated; then to initiate the loading of the digital error signal into the appropriate firing circuit; and then to determine whether the negative polarity or positive polarity controllable rectifiers are to be fired by the firing circuits.

Having loaded the digital error signal into the firing circuit, it is then necessary to act on that digital error signal to generate and appropriately timed firing pulse. The timing of this firing pulse is controlled by a clock generator 10 which feeds each of the firing circuits 5a, 5b and 5c. In the particular embodiment shown, the firing circuits comprise a digital counter which accepts the digital error signal from the digital error generator 7. This error signal is counted by the firing circuit until a predetermined count is reached at which point a firing signal for the appropriate SCR is generated. This operation will be explained in greater detail later hereinafter in the course of the discussion of the specific firing circuit illustrated in FIG. 4.

Briefly stated, the operation of the system shown in FIG. 1 can be defined in terms of the following steps:

1. The output of the digital command generator 6 is compared with the output of the feedback device 8 in the digital error generator 7 to arrive at a digital error signal.
2. The phase detection circuit 9 examines the three AC waveforms from transformer windings 1a, 1b and c which are connected to its input terminals 11a, 11b and 11c and generates signals on its outputs, 9a, 9b and 9c when the contents of digital error generator 7 are to be loaded into a particular firing circuit. It also generates signals which control the up and down control lines of the firing circuits. Hence, the connection of output terminal 9a of the phase detection circuit 9 to the input terminal 12a of the firing circuit 5a operates to load the contents of digital error generator 7 into firing circuit 5a at an appropriate time as determined by the phase detection circuit 9.
3. The contents of digital error generator 7 are loaded into the firing circuits 5a, 5b and 5c by virtue of the connections to the firing circuits on input terminals 13a, 13b and 13c, respectively.
4. After the digital error from the digital error generator 7 is loaded into the appropriate firing circuit, such as for example, firing circuit 5a, the output of the clock generator 10 is fed into a counter which comprises a major portion of the firing circuit 5a and counts in one direction or the other depending upon whether the positive polarity controllable rectifier or the negative polarity controllable rectifier is to be fired. When a predetermined count is reached, a firing pulse is generated and relayed to the appropriate controllable rectifier. Hence, if the phase detection circuit 9 provides a logic "1" at terminal 15a, an output pulse is relayed from output terminal 18a to initiate the conduction of the positively poled SCR 4a. On the other hand, if a logic "1" is applied to the terminal 16a, a firing pulse is generated on the output terminal 17a to energize the gate of and to fire the negatively poled SCR 3a. Operation is, of course, identical for firing circuits 5b and 5c which activate SCR's 3b, 4b and 3c, 4c connected to the b and c phases of the three-phase power source 1.

Figure 2:
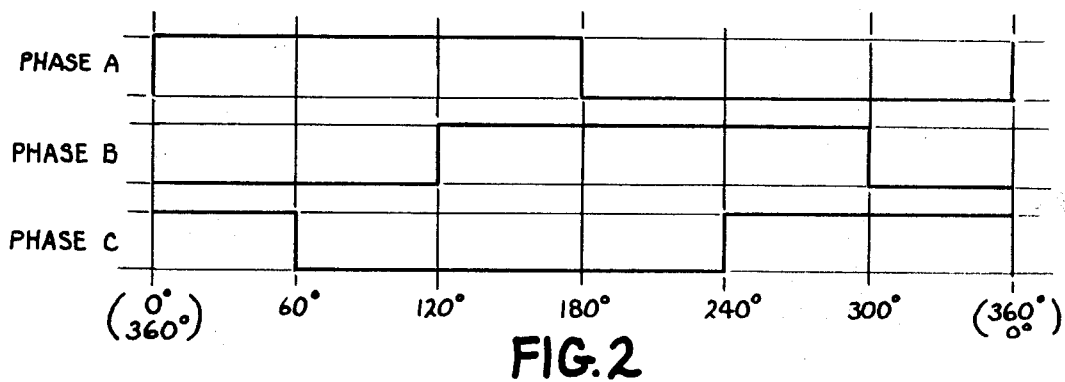
FIG. 2 is a timing diagram illustrating the time relationship of the three-phase AC input.

Turning now to FIG. 2, there is shown, in square wave form, the well-known relationship between the three phases of an AC source such as the AC source 1 of FIG. 1. As was seen in the description of FIG. 1, there are two SCR's connected to each phase of the AC source 1. These SCR's are oppositely poled so as to conduct current in opposite directions. By way of example, SCR's 3a and 4a are connected to the A-phase of AC source 1 via winding 1a. In any control system of this type, it is necessary to determine the particular portion of the AC waveform during which a particular SCR can be permitted to conduct.

One method of controlling the conduction of the SCR's is to permit the positively poled SCR to conduct during the entire portion of the AC waveform during which the polarity is positive and to permit the negatively poled SCR to conduct during the entire negative portion of the AC waveform. Hence, SCR 4a might be permitted to conduct during the positive portion of the AC waveform on the A-phase, i.e., from 0° to 180°. Similarly, SCR 3a would be permitted to conduct from 180° to 360°. In such a system, the error in the digital error generator 7 together with the clock generator 10 output, FIG. 1, would be loaded into the A firing circuit 5a at 0° and at 180°.

As was shown in the description of FIG. 1, the time at which the error from digital error generator 7 is loaded into the firing circuit is controlled by the phase detection circuit 9. Hence, for the A firing circuit 5a, the phase detection circuit 9 would generate output pulses on terminal 9a at 9° and at 180° which would result in loading the error from digital error generator 7 into firing circuit 5a.

Certain systems, however, may require that the digital error be loaded at times which are not necessarily in phase with the associated SCR waveform. For example, it may be desired to allow a particularly poled SCR to conduct only during a limited portion of its associated AC input. In the case of the present embodiment, it is desired to allow each SCR to conduct only during the last 120° of its associated AC input plus 60° into the negative half of the applied voltage to allow for dynamic motor braking. Thus SCR 4a will be allowed to conduct from 60° to 240° while SCR 3a will be allowed to conduct from 240° to 60°. Similarly, SCR 4b can conduct from 180° to 360° and SCR 3b from 0° to 180°. Finally, SCR 4c can conduct from 300° to 120° and SCR 3c from 120° to 300°. Hence, since the purpose of the phase detection circuit 9 is to synchronize the firing circuits with the AC power, it must generate output pulses at the beginning of each of these intervals.

Figure 3:
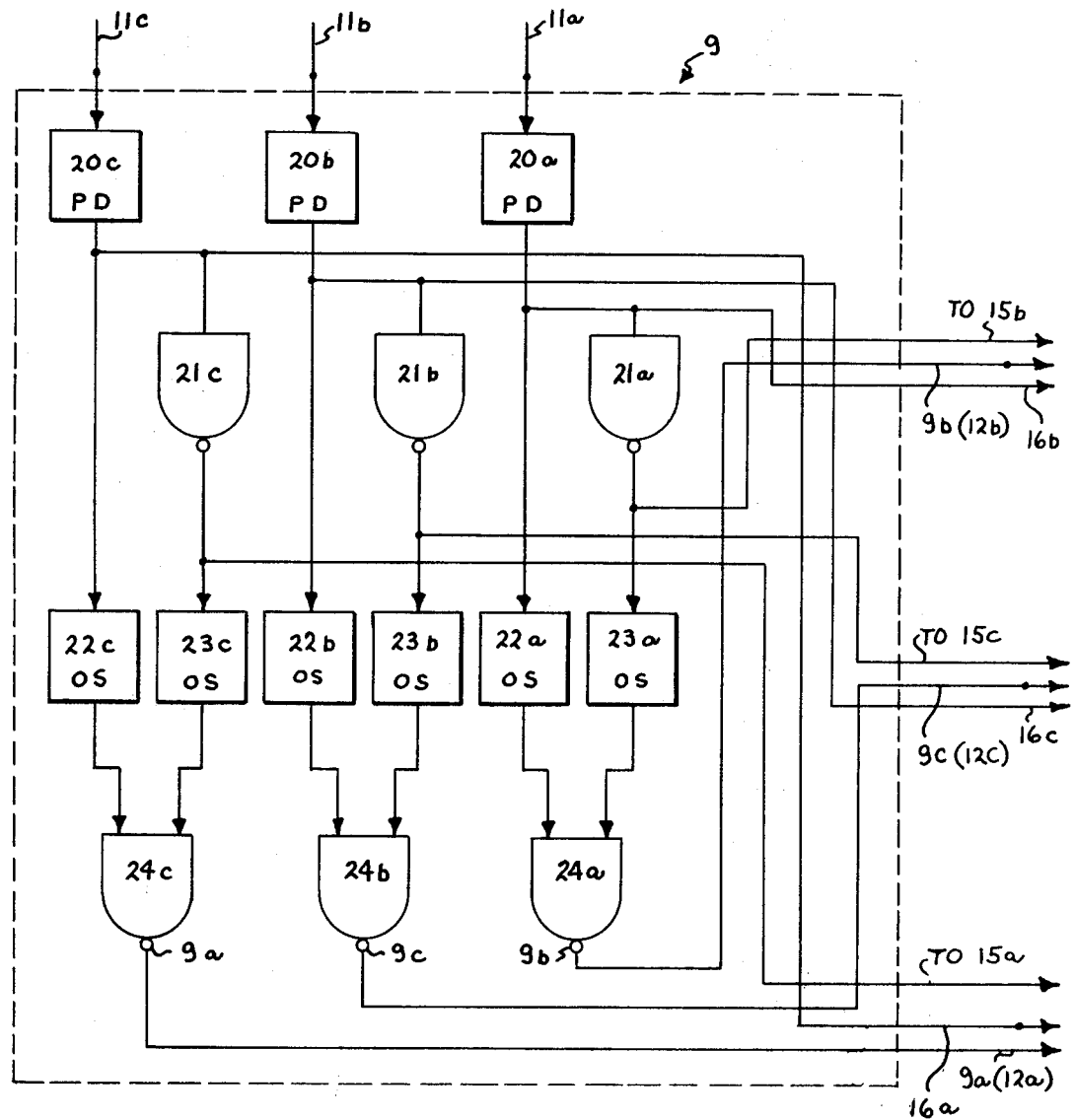
FIG. 3 is a detailed logic diagram of the phase detection circuit shown in FIG. 1.
Figure 4:
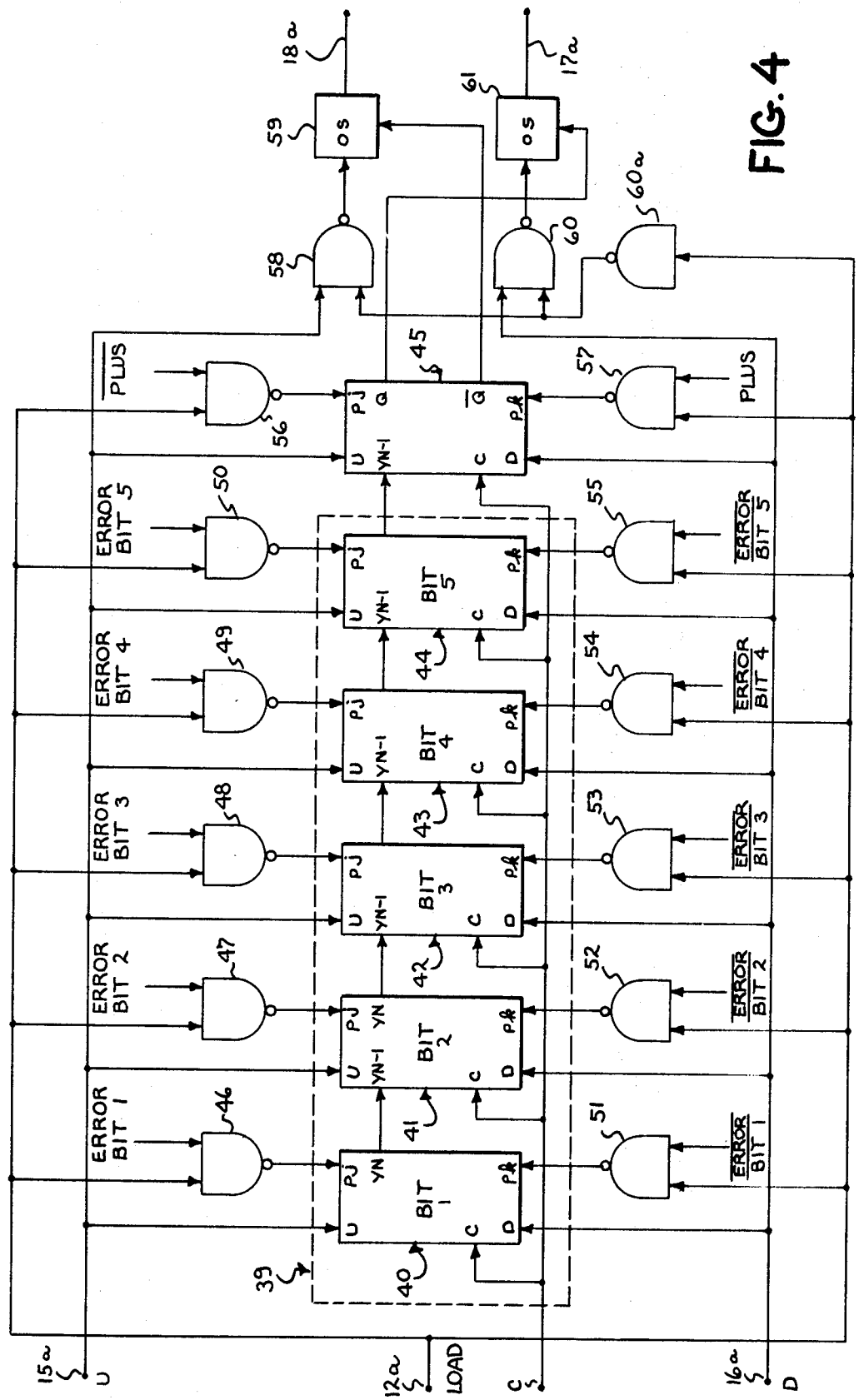
FIG. 4 is a detailed logic diagram of one of the firing circuits of FIG. 1.
Figure 5:
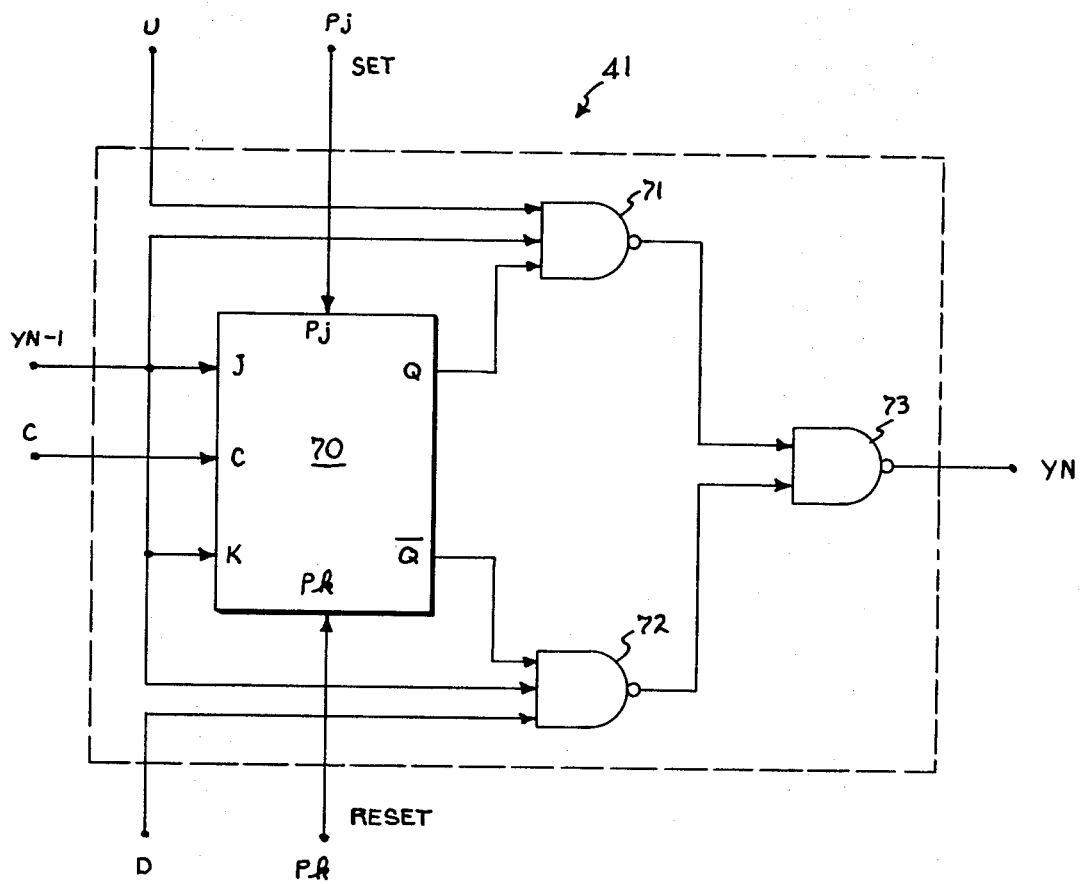
FIG. 5 is a detailed logic diagram of one of the counter units of FIG. 4.

Before turning to the detailed logic diagram of FIGS. 3, 4, and 5, it is necessary to describe the logic elements used therein. Since the present embodiment is a digital system, the apparatus described operates at two logic levels, referred to as logic "0" and logic "1." These logic levels are really ways of identifying a particular voltage level. For example, a logic "1" may be some positive voltages, say +4 volts, whereas logic "0" will be a lower voltage, say 0 volts. It is clear, of course, that the particular logic levels form no part of the present invention and are referred to only to assist in the description of the preferred embodiment. In addition, it is also clear that while the preferred embodiment uses NAND logic, any type of logic system, positive or negative, could be used equally well without departing from the spirit of the invention.

In FIG. 3, the logic element denoted with a the number 24 is a simple NAND gate. The operation of the gate is such that when all of its inputs (denoted by an arrow) are logic "1," the output (denoted by the circle) will be a logic "0." Under all other conditions, the output of gate 24 will be a logic "1" This is true regardless of the number of inputs provided. Thus, if a gate has only a single input (such as NAND gate 21) it operates as a simple inverter since when its single input is a logic "1," its output will be a logic "0." Conversely, if its single input is a logic "0," Conversely, if its single input is a logic "0," its output will be a logic "1" so that it functions to invert the sense of the logic signal at its input.

The logic element in FIG. 3 denoted with the number 20 and labeled PD is a phase detector which operates to shape a sinusoidal AC input into a square wave. In its simplest form, the phase detector 20 may comprise, for example, an amplifier and clipper which amplifies the AC input signal and clips it at a certain voltage level compatible with the logic system in which it is used.

The logic symbol in FIG. 3 denoted with the number 22 and labeled "OS" is a simple one-shot multivibrator. It operates in response to a signal on its input, denoted by the arrow, to generate a pulse of a predetermined duration on its output. The specific one shot shown in FIG. 3 operates in the following fashion—when the signal at its input goes from a logic "1" to a logic "0" a pulse will be generated on the output which goes from logic "1" to logic "0" for a predetermined period of time.

In FIG. 4, the logic element denoted "Bit 2" and indicated by the number 41 is a reversible counter stage. Operation of the reversible counter stage 41 can best be understood by referring to FIG. 5 which shows the detailed logic diagram of the reversible counter stage 41. Reversible counter stage 41 comprises a standard steered J-K flip-flop 70 and three NAND gates 71, 72, and 73. The J-K flip-flop operates in the following well-known fashion. The two inputs labeled P$j$ and P$k$ are the direct set and direct reset terminals, respectively, and operate such that the application of a logic "0" on the P$j$ terminal causes the J-K flip-flop 70 to assume the set state. Conversely, application of a logic "0" to the P$k$ terminal cause the J-K flip-flop 70 to assume the reset state. The J and K input terminals are the set steering and reset steering terminals, respectively. Finally, the C terminal is the trigger or clock terminal. Operation of the J-K flip-flop from the set and reset steering terminal is as follows: a logic "1" at the set steering terminal J, followed by a trigger signal on the clock terminal C causes J-K flip-flop to assume the set state. A trigger signal at the clock terminal C is defined as a signal going from logic "0" to logic "1." Similarly, a logic "1" at the reset steering terminal K followed by a trigger at the clock terminal C causes the J-K flip-flop 70 to assume the reset state. If a logic "1" exists on both the J and K input terminals, the J-K flip-flop 70 will be caused to change state at the next trigger on the clock terminal C. The output terminals Q and $\overline{Q}$ indicate the state of the J-K flip-flop 70. The Q output terminal will be a logic "1" when the J-K flip-flop 70 is set and the $\overline{Q}$ output terminal will be a logic "1" when the J-K flip-flop is reset.

The combination of J-K flip-flop 70, and NAND gates 71, 72 and 73 forms a single stage of a reversible counter of the nonripple type. That is, when the counter receives an input pulse all stages of the counter change state simultaneously rather than succeeding stages being activated by changes in preceding stages as is true in a counter of the ripple type. Hence, the counter stage 41 has a first input terminal labeled $YN-1$ which has the following Boolean characteristic in order to form part of a synchronous type reversible counter.

$YN-1 = UP \cdot Q \cdot YN-1 + DOWN - YN-1 \cdot \overline{Q}$ ($YN-1$ is input to stage 41)
($YN-1 \cdot Q$ from stage 40)
($YN-1 \cdot \overline{Q}$ is from stage 40)

In other words, the input on terminal $YN-1$ will be a logic "1" when the counter is counting in the up direction *and* all preceding stages are set *or*, when the counter is operating as a down counter *and* all preceding stages are reset. The input terminal labeled C is, of course, the clock input terminal.

To determine the direction in which the counter will count, there are provided two additional input terminals labeled U and D which are the up and down count terminals, respectively. In addition, in order to preset the counter to the desired number, there are provided input terminals P$j$ and P$k$ which constitute the direct set and reset input terminals, respectively.

The output of each stage, the signal YN, has the following Boolean characteristic:

$YN = UP \cdot Q \cdot YN-1 + DOWN \cdot \overline{Q} \cdot YN-1$

In other words, the signal YN will be a logic "1" the particular stage and all preceding stages are set when the counter is counting up or if the particular stage and all preceding stages are reset when the counter is counting down. The first part of this relationship ($UP \cdot Q \cdot YN-1$) is accomplished by gate 71 which has as its input the signal U, the signal $YN-1$ and the Q output of the J-K output 70. If all three of these signals are logic "1" then the output of gate 71 will be a logic "0." Since the output of gate 71 forms one of the inputs to gate 73, the output of gate 73, under these conditions, will be a logic "1." Similarly, the second part of this relationship (DOWN·$\overline{Q}$·$YN-1$) is accomplished by gate 72 which has as its inputs the signal D, the signal $YN-1$, and the $\overline{Q}$ output of J-K flip-flop 70. If all three of these signals are logic "1" then the output of gate 72 will be a logic "0." Since the output of gate 72 forms the second input to gate 73, the output of gate 73 will be a logic "1" whenever the output of gate 72 is a logic "0." The interrelation and operation of the multiple stages of a complete reversible counter will be explained in more detail during the detailed description of the firing circuit shown in FIG. 4.

Turning now to FIG. 3, there is shown the detailed logic diagram of the phase detection circuit 9 of FIG. 1. As was pointed out in the description of FIG. 1, the purpose of the phase detection circuit 9 is to synchronize the loading of the digital error from the digital error generator 7 into the firing circuits 5a, 5b and 5c and to control whether the positive or negative poled controllable rectifier is fired by the firing circuits. Hence, the phase detection circuit 9 has as its inputs the three AC phases which are connected to input terminals 11a, 11b and 11c. As discussed above, the present embodiment operates so as to control conduction of the SCR's from 120° advance to 60° retard. This is accomplished by the logic shown in FIG. 3.

By way of example, it has been shown that the digital error from digital error generator 7 FIG. 1 is to be loaded into the B-firing circuit 5b at 0° and at 180°. These particular times happen to be synchronous with the changes in polarity of the A-phase from the AC source. Hence, the phase detection circuit 9 will command the loading of the error from digital error generator 7 into the B-firing circuit 5b whenever the A-phase changes polarity. This is accomplished by virtue of the phase detectors 20a, b and c FIG. 3 which operate to transform the three phases from sinusoidal to square wave signals. The output of phase detector 20a is fed to a first one-shot 22a. When the A-phase changes from positive polarity to negative polarity at 180° the output of the phase detector 20a will change from a logic "1" to a logic "0." Since the output of phase detector 20a forms the input to one-shot 22a, one-shot 22a will put out a signal at this time which change from logic "1" to logic "0" for a predetermined period of time. The output of the one shot 22a forms one input to gate 24a so that the output of gate 24a will go from logic "0" to logic "1" in response to a pulse from one shot 22a. This pulse will be relayed via output terminal 9b to the B-firing circuit 5b to effect the loading of the digital error from digital error generator 7 into the B-firing circuit 5b.

Referring again to FIG. 2 as well as FIG. 3, note that at the 180° point of the operating cycle the phase A-voltage from the phase detector 20a will change from a logic "1" to a logic "0" causing the output of gate 21a to change from a logic "0" causing the output of gate 21a to change from a logic "0" to a logic "1" which is fed to an input terminal 15b of the firing circuit 5b. The counter is energized to count up and to provide a firing signal at terminal 18b for the positive polarity controllable rectifier 4b.

Similarly, at 0°, the A-phase changes from negative polarity to positive polarity so that the output of the phase detector 20a changes from logic "0" to logic "1." Since this output forms the single input to gate 21a, the output of gate 21a will at this point change from logic "1" to logic "0." This output forms the input to a second one-shot 23a which will then put out a pulse which goes from logic "1" to logic "0" for a predetermined period of time. Since the output of one-shot 23a forms the second input to gate 24a, gate 24a will also put out this pulse at output terminal 9b so as to effect the loading of the contents of digital error generator 7 into the B-firing circuit 5b at 0°.

Referring again to FIG. 2 along with FIG. 3, after 0°, the output from the phase detector 20a is positive in polarity which indicates that the line leading to terminal 16b is at a logic "1." The positive polarity controllable rectifier 4b cannot be fired at this time. A logic "1" at the input terminal 16b of the firing circuit 5b causes the firing signal to appear at the appropriate point in the cycle at terminal 17b to fire the negative polarity controllable rectifier 3b.

It can be seen that in a control system which allows the controlled SCR's to conduct from 120° advance to 60° retard, the digital error is loaded into the A-firing circuit 5a at the same time that the C-phase changes polarity and that the contents of digital error generator 7 are loaded into the C-firing circuit 5c at the same time that the B-phase changes polarity. The necessary signals to effect the loading of the error signal into the other two firing circuits, 5a and 5c, are accomplished in identical fashion by the remainder of the logic circuitry shown in FIG. 3. This circuitry is identical in form and operation to that described for loading the error into the B-firing circuit 5b and is denoted with similar numbers, suffixed with the letters a and c.

In order to fully understand the firing circuit of FIG. 4, it is first necessary to explain the form of the error signal generated by the digital error generator 7. This error signal may be of any polarity. The digital error signal of the present embodiment is in pure binary notation, but any two-bit code could be used with minor modifications in the logic circuitry. For the purposes of explaining the present embodiment, the digital error signal is assumed to be a five-bit pure binary number with a sixth (most significant) bit being used to represent the sign of the error.

For positive errors, the error signal indicates the magnitude of the error in pure binary with the sign bit being a "0" to indicate a positive error.

For negative error signals, the sign bit is a "1" and the magnitude of the error is coded in the so-called two's complement. That is, a negative number is obtained by beginning with a positive number of corresponding magnitude and substituting 1's for 0's and 0's for 1's sand adding 1 to the result.

The following examples serve to illustrate the coding of the digital error signals which are used in the present embodiment:

```
    +5=000101
    −5=111010
       +    1
    ─────────
       111011
```

Turning now to FIG. 4, there is shown a detailed logic diagram of the firing circuit 5a of FIG. 1. Firing circuits 5b and 5c are identical. In present embodiment, the desired firing angle is directly proportional to the magnitude of the digital error signal. Thus, an error signal of maximum magnitude should result in firing the SCR's at the earliest possible time, i.e., 120° prior to a change in the polarity of the AC input. Briefly, this is accomplished by loading the digital error signal into a reversible counter 39 composed of counter stages 40–44. The reversible counter 39 input is then counted at an established rate until a predetermined number is reached, at which time the firing pulse is generated. When the phase detector 9 indicates that a positive polarity controllable rectifier should be fired, the reversible counter 39 counts up. When the counter overflows its capacity, the firing pulse is generated for this positive polarity controllable rectifier. On the other hand, if the phase detector 9 indicates that a negative polarity SCR should be fired, the reversible counter 39 counts down and a firing pulse is generated for the negative polarity SCR when the reversible counter 39 reaches a negative overflow.

The reversible counter 39 is shown as a five-bit reversible counter so that the maximum positive error signal is, in pure binary notation, 11111 (31). While the present embodiment is shown as comprising a five-bit counter, it will be obvious to those skilled in the art that any number of bits could be used with minor modifications in the logic circuitry and the input clock frequency. To determine the frequency of clock generator 10, one need only divide the required count of the reversible counter 39 by the length of the period before which an SCR is allowed to conduct. In the present embodiment, the counter has a count of 31 to delay the SCR firing by 120° which equals one-third of an AC cycle. If the AC input is conventional 60 cycles per second then an SCR can be delayed for one one hundred-eightieth of a second or 5.556 milliseconds. Therefore, the frequency of clock generator 10 should be 31×180=5.58 kHz.

The firing circuit of FIG. 4 is composed of a reversible counter 39 which consists of counter stages 40–44 plus an additional counter stage 45 which stores the sign of the error. In operation, the error is loaded into the firing circuit upon receipt of a load pulse on input terminal 12a. This load pulse, as was pointed out above, is received from the phase detection circuit 9.

The contents of the digital error generator 7 are loaded into the firing circuit 5a since the five bits of the digital error form one input to each of a plurality of gates 46–50 and 51–55. As shown in FIG. 4, the signal Error Bit 1 forms one of the inputs to gate 46, whereas the signal $\overline{\text{Error Bit 1}}$ forms one of the inputs to gate 51. The other error bits form corresponding inputs to gates 47–50 and gates 52–55. If the first error bit is a 1 then the signal Error Bit 1 is a logic "1," whereas the signal $\overline{\text{Error Bit 1}}$ is a logic "0." Upon receipt of a load pulse on input terminal 12a, the other input to gates 46–50 and 51–55 will go from logic "0" to logic "1." At this time, the output of gate 46 will go to logic "0" which, by virtue of its connection to the Pj terminal of counter stage 40, causes counter stage 40 to assume the set state. Since the signal $\overline{\text{Error Bit 1}}$ on gate 51 is a logic "0," the output of gate 51 will remain at logic "1" so that counter stage 40 is not commanded to reset. On the other hand, if the first bit of the error had been a logic "0," then the signal Error Bit 1 would have been a logic "1." Upon the receipt of a load pulse on input terminal 12a, the output of gate 51 would go to logic "0" which would, by virtue of its connection to the Pk terminal of counter stage 40, cause the counter stage 40 to reset. In this fashion, the digital error from digital error generator 7 will be loaded into the reversible counter 39 of the firing circuit 5a.

In addition to loading the magnitude of the error, it is also necessary to load the sign of the error into counter stage 45. This is accomplished by virtue of the signal $\overline{\text{Plus sign}}$ as one input to gate 56 and the signal Plus sign as one input to gate 57. Since the load terminal 12a is also connected to form the second input to gates 56 and 57, it is clear that counter stage 45 will be set if the sign of the error is minus and reset if the sign of the error is plus. The load terminal 12a is also coupled to a gate 60a where the signal Load is converted to a signal $\overline{\text{Load}}$. The output from the gate 60a, or the signal $\overline{\text{Load}}$, is coupled to gates 58 and 60. The purpose of the signal $\overline{\text{Load}}$ is to prevent the gates 58 and 60 from enabling the one shots 59 and 61, respectively, while the counter 39 is being loaded. Because the signal $\overline{\text{Load}}$ is a logic "0" while one of the one shots 22b and 23b of FIG. 3 has completed its output signal, and the reversible counter has been loaded, the gates 58 and 60 cannot enable the one shots 59 and 61 until after this time.

Having loaded the error signal into the reversible counter 39, it is now necessary that the counter count in the appropriate direction until it overflows and stage 45 sets or counts backwards until counter stage 45 resets. In case of a positive phase voltage, the signal on input terminal 15a will be a logic "1" so as to command the reversible counter 39 to count up. This terminal 15a is connected to the U-input terminals of the counter stages 40–44 so that it will count up from its preset number at a rate determined by the clock pulses present on input terminal 14a. When the reversible counter 39 has counted to its full capacity (11111), the next pulse will result in returning all counter stages to 0. At the same time, counter stage 45, having been previously reset due to the positive sign of the error, will assume the set state.

When counter stage 45 sets, the output Q of stage 45 will go to logic "0." At this point, because the output of gate 58 is a logic "0," one-shot 59 will generate a pulse going from logic "1" to logic "0" and this pulse will be fed to SCR 4a to initiate conduction of SCR 4a. Thus, the firing circuit 5a has acted in response to the contents of digital error generator 7 to generate a firing pulse appropriately timed and be directly proportional to the magnitude of the digital error.

Having loaded an error signal into the reversible counter 39 and if the down input 16a is a logic "1," reversible counter 39 and to count $\overline{down}$ at a rate determined by the clock frequency applied to input terminal 14a. When the reversible counter 39 counts the maximum negative number, the next pulse will result in resetting the counter stage 45. When counter stage 45 resets, the output Q of stage 45 will go to logic "0." Because the output of gate 60 is a logic "0," one-shot 61 will generate a pulse on its output which goes from logic "1" to logic "0" at this time. This pulse will be relayed to initiate conduction of the negatively poled SCR 3a.

Although the invention has been described with respect to a particular embodiment, the principles underlying this invention will suggest many additional modifications of this particular embodiment to those skilled in the art. For example, it is not necessary that a separate error counter be used for each phase of voltage supplied to the load. A pair of counters can be used, one a forward counter used, say, for controlling the firing of the positive polarity controllable rectifiers and another, a reverse counter, used for controlling the firing of the negative polarity controllable rectifiers. With this arrangement the controllable rectifiers can each only be fired over a 120° interval, say from 90° advanced to 30° retarded.

Those skilled in the art will recognize that this invention may be used to provide full wave rectified power to a load, such as a dynamoelectric machine. In this event, additional controlled rectifiers, firing circuits, etc., would be necessary to complete a full wave system.

Therefore, it is intended that the appended claims shall not be limited to the specific embodiments described, but rather shall cover all such modifications as fall within the true spirit and scope of the invention.

What is claimed as new and desired to secure by Letters Patent of the United States is:

1. A digital control system for controlling the flow of power from an AC source to a load comprising, in combination:
    a. a set of controllable rectifiers, poled in opposite directions, connected between the AC source and the load;
    b. a digital error generator responsive to command and feedback signals for generating digital error signals;
    c. phase detection means operatively coupled to the AC source and responsive thereto to generate a phase output signal at the earliest point in each half cycle of the AC wave at which the respective one of said controllable rectifiers may be permitted to conduct; and
    d. means having inputs coupled to said digital error generator and said phase detection means and including counter and register circuits responsive to the phase output signal and the error signals to generate a trigger pulse during a predetermined time interval beginning with receipt of the phase output signal, the time of firing within said predetermined time interval being determined by the digital magnitude of the error signal.

2. The digital control system as recited in claim 1 wherein said counter and register circuits comprise a reversible counter which counts in one direction when an AC source voltage is positive in polarity and in the other direction when when an AC source voltage is negative in polarity.

3. The digital control system as recited in claim 2 wherein said counter and register circuits produce a firing pulse for said positively poled controllable rectifier when said error counter reaches a predetermined count in the one direction and produces a firing pulse for said negatively poled controllable rectifier when said error counter reaches a predetermined count in the other direction.

4. The digital control system as recited in claim 1 wherein the combination included a dynamoelectric machine as a load.

5. The digital control system as recited in claim 1 wherein said phase detection means operates to initiate conduction during the last 120° of each half cycle of the AC input and during the first 60° of the next half cycle.

6. The method of controlling the transfer of power from an AC source to a load comprising the steps of:
    a. generating an error signal in digital form in response to command and feedback signals;
    b. sensing the AC wave shape and generating a signal at the first point in each half cycle at which power is permitted to be transferred to the load;
    c. loading the digital error signal into an error counter in response to the signal of step (b);
    d. counting the error counter at a predetermined rate from the count of the digital error signal; and
    e. firing a controllable rectifier connected between the AC source and the load when the error counter reaches a predetermined count.

7. The method set forth in claim 6 wherein step (b) comprises generating a signal at 120° advance during each half cycle.

8. A digital firing circuit operative to fire one of a pair of oppositely poled controllable rectifiers connected to an AC source in response to input signals including a digital error signal and phase signal indicating the earliest points within the AC wave form at which the controllable rectifiers can be fired, said digital firing circuit comprising:
    a. a digital counter having inputs coupled to receive the digital error signal and the phase signal and being responsive to the signals to begin counting upon receipt of the phase signal at a predetermined rate from a base count determined by the digital magnitude of the error signal, and
    b. means responsive to said digital counter for producing a firing signal when the count of said digital counter reaches a predetermined value.

9. The digital firing circuit recited in claim 8 wherein said digital counter comprises a reversible counter which counts in one direction when an AC source voltage is positive in polarity and counts in the other direction when an AC source voltage is negative in polarity.

10. The digital firing circuit recited in claim 8 wherein said phase detection means operates to initiate conduction during the last 120° of each polarity of the AC input.

11. The digital firing circuit recited in claim 9 whereby said sensing means produces a firing signal for the positively poled SCR whenever said digital counter overflows in the aforesaid one direction and produces a firing signal for the negatively poled SCR whenever said digital counter overflows in the aforesaid other direction.

12. The digital control system according to claim 8 wherein the combination includes a dynamoelectric machine as a load.